Sept. 8, 1970    R. E. MOTSINGER    3,527,317
SOUND CONTROL OF TURBOFAN ENGINES
Filed April 18, 1969    2 Sheets-Sheet 1
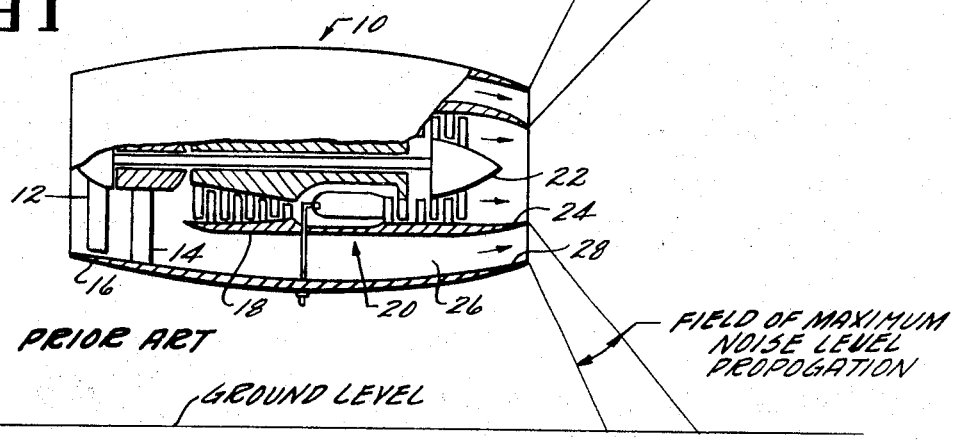
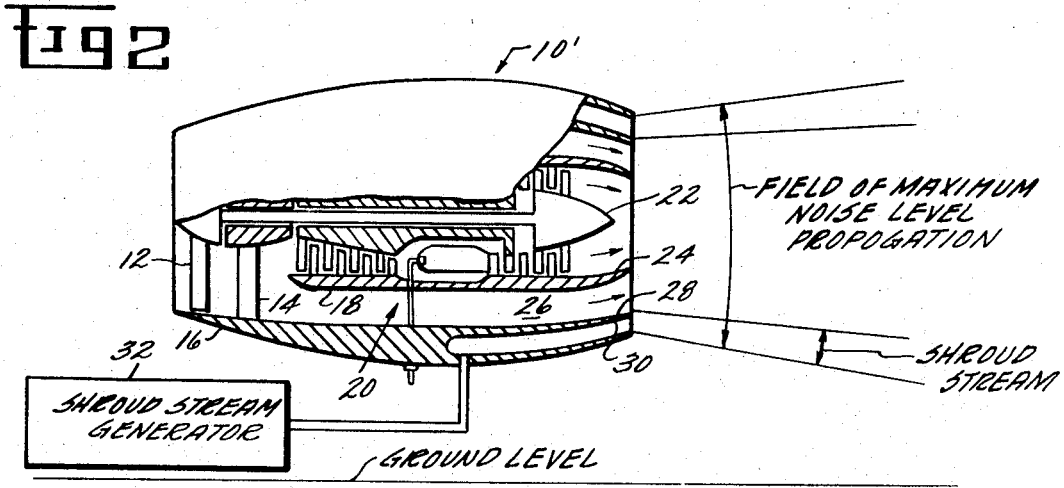
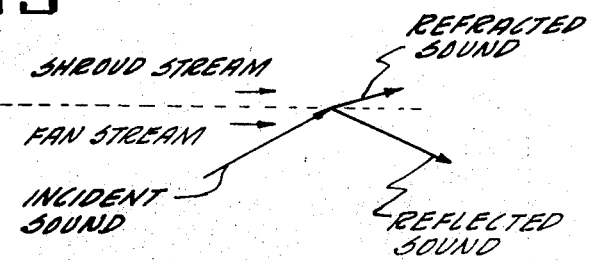
INVENTOR.
RUSSELL E. MOTSINGER
BY
ATTORNEY

INVENTOR.
RUSSELL E. MOTSINGER
BY
ATTORNEY

United States Patent Office 3,527,317
Patented Sept. 8, 1970

3,527,317
SOUND CONTROL OF TURBOFAN ENGINES
Russell E. Motsinger, Cincinnati, Ohio, assignor to General Electric Company, a corporation of New York
Filed Apr. 18, 1969, Ser. No. 817,432
Int. Cl. B64d 33/06; F01n 1/00, 1/14
U.S. Cl. 181—35                                    11 Claims

ABSTRACT OF THE DISCLOSURE

In a turbofan engine, the angle of noise propagation from a fan stream propulsion nozzle is limited and controlled by a shrouding gas stream having a higher sonic speed than the fan stream. Three embodiments respectively show use of a high temperature gas stream, a water vapor gas stream, and the core engine gas stream as shrouding streams to control the angle of noise propagation.

---

The present invention relates to improvements in gas turbine engines and, more particularly, to improvements in minimizing undesirable sound characteristics of turbofan engines.

A turbofan engine comprises an axial flow compressor, commonly referred to as a fan, which pressurizes a relatively low velocity air stream for discharge through a nozzle to provide propulsive force for an aircraft. The fan rotor is driven by a core engine or gas generator. A portion of the air pressurized by the fan is directed to the core engine to support combustion of fuel in the generation of a hot gas stream. The remainder of the air pressurized by the fan bypasses the engine for discharge through the propulsive nozzle.

Dramatic improvements in fuel economy have recently been demonstrated by high bypass ratio turbofan engines wherein the ratio of air discharged through the propulsive nozzle to air utilized in the core engine is relatively large. Among other things, this has resulted in the propulsive force of the engine being derived primarily from the air stream. In such turbofan engines, the fan diameter and peripheral speeds of the fan rotor are quite large. A resultant condition is that the noise generated by discharge of the hot gas stream from the core engine is relatively small compared to the noise generated by the fan rotor.

In anticipation of widespread commercial use of such high bypass, turbofan engines, and recognizing that the fan noise problem is not generally susceptible to the same solutions for suppressing jet noise, there has been tremendous effort extended to reduce, suppress, or control the noise generated by such fans. Many different approaches have been proposed, based primarily on the use of suppression liners or efforts to reduce fan rotor speed (and the noise generated thereby) while providing some temporary augmentation of thrust output, as by increasing the energy level of the hot gas stream.

While many of these proposals have been effective in one way or another in reducing sound levels, generally speaking, they have failed to accomplish the desired goals for sound levels of aircraft operating in close proximity to populated areas where high energy sound levels have both an economic and sociological impact. More particularly, those proposals which have been most effective in reducing sound have usually resulted in engine performance penalties, either in the form of added weight or loss of thrust capability or other factors which decrease engine efficiency in its major portion of operation at high altitudes where sound or noise is not a problem.

Accordingly, the object of the present invention is to effectively reduce the undesirable effects of noise in the propulsion of aircraft particularly when operating in close proximity to populated areas.

Another object of the invention is to accomplish the above ends in a manner enabling efficient operation of such engines during the major portion of their operation, where a sound control or sound reduction regime is not required.

In understanding the present invention, it should first be recognized that the rotating blades of a turbofan engine generate noise within a duct which leads to the discharge nozzle. This noise propagates from the blades primarily in a forwardly and rearwardly direction. It has been established that the rearwardly propagated noise radiates from the fan stream discharge nozzle at relatively wide angles and is the predominant source of noise produced by the engine. In other words, because of this wide angle of noise propagation, an undesirable effect is imposed on wide areas over which an aircraft might pass. This type of noise is referred to as sideline noise and is measured at a point generally normal to the axis of the engine and its propulsive nozzle.

In its broader aspects the present invention provides means for limiting the level of fan generated noise radiated to the sideline from the fan propulsion nozzle.

The invention provides means for providing a fluid stream which shrouds the fan stream and reflects or refracts fan noise to limit its angle of propagation. More specifically, the fluid shroud stream provided for this purpose has a higher sonic speed than the air stream which carries the fan generated noise.

There are two principal approaches to obtaining a higher sonic speed in the shrouding fluid stream. The first is to provide a high temperature stream, and the second is to provide a shroud stream having a low molecular weight. Thus, the shrouding stream, in accordance with one aspect of the invention, may take the form of a heated air stream and, in accordance with another aspect of the invention, the shrouding stream may take the form of a water vapor stream.

In accordance with yet another aspect of the invention, the shrouding stream may be provided by ducting the hot gas stream of the core engine to an annular fluid flow path surrounding the fan stream at its discharge, propulsive nozzle.

The above and other related objects and features of the invention will be apparent from a reading of the following description of the disclosure found in the accompanying drawings and the novelty thereof pointed out in the appended claims.

In the drawings:

FIG. 1 is a simplified showing of a turbofan engine of conventional design illustrating the manner in which noise is propagated;

FIG. 2 is a simplified showing of a turbofan engine in accordance with the present invention and illustrating the manner in which noise is propagated therefrom;

FIG. 3 is a diagrammatic illustration of the manner in which sound waves are controlled in accordance with the invention;

Figure 4:
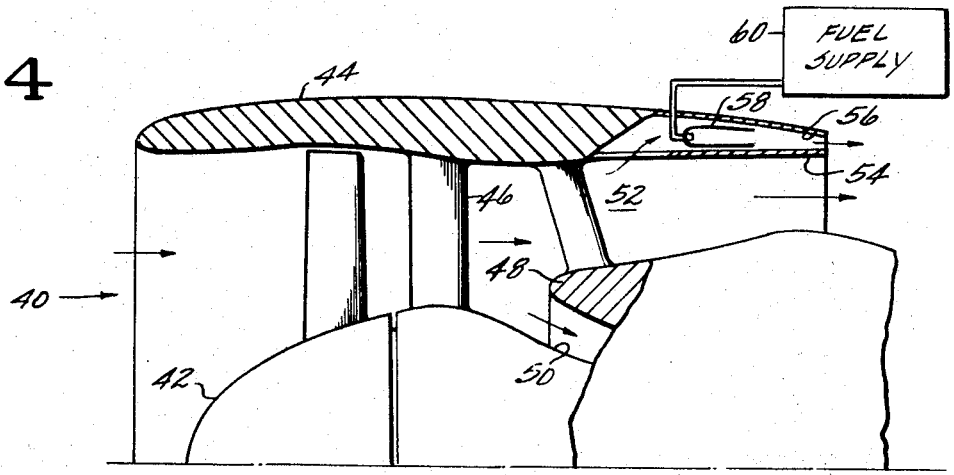
FIG. 4 is a simplified showing of a turbofan engine embodying the present invention.

Reference is first made to FIG. 1 for a better understanding of the general problems involved in the propagation of noise from a turbofan engine. FIG. 1 shows in simplified fashion a turbofan engine 10, comprising a bladed fan rotor 12, for pressurizing an air stream which is straightened by outlet guide vanes 14. The air stream thus pressurized within a shroud or outer casing 16 is then split at the forward end of a nacelle 18. The inner annular portion of the air stream enters a core engine 20 to support combustion of fuel in the generation of a hot gas stream. The hot gas stream drives a fan turbine 22 which is connected to and drives the fan rotor 12. The hot gas stream is then discharged from a nozzle 24 to provide a portion of the propulsive thrust generated by the engine.

The outer annular portion of the air stream pressurized by the fan rotor 12 enters a fan duct 26, defined by the outer casing 16 and the nacelle 18. The pressurized fan stream is then discharged from an annular nozzle 28 to provide the major portion of the thrust generated by the turbofan engine.

As was indicated above, the blades of the fan rotor 12 generate high energy noise in the fan stream. This noise, as it is propagated rearly, radiates at the annular discharge nozzle 28 in such a manner that the field of maximum noise level propagation is generated in an annular cone of relatively wide divergence, as is evident from FIG. 1. It will also be apparent that when an aircraft is approaching or taking off from an airport, with this wide angle of propagation, the sound waves have a very short path to any populated areas over which an aircraft would pass.

FIG. 2 illustrates the effects of the present invention in narrowing the angle of noise propagation from the fan stream discharge nozzle. The engine 10' illustrated in FIG. 2 is identical with the engine 10 seen in FIG. 1, with the exception that means are provided for discharging an outer fluid shroud stream from an annular discharge nozzle 30 which surrounds the fan discharge nozzle 28. The remainder of the components of the engine 10' are identical with those of the engine 10 and identified by like reference characters. The shroud stream nozzle is supplied with pressurized gas derived from a generator 32 which provides a gas stream having a high sonic speed. The means for providing such a gas stream will be dealt with in greater detail hereinafter.

However, for present purposes it will be noted that the provision of such a shrouding gas stream drastically reduces the angle of propagation of sound from the fan discharge nozzle. By limiting the angle of noise propagation from the fan nozzle in the manner described, it becomes apparent that when an aircraft is in low altitude flight, the area affected by maximum sound levels is reduced and the distance sound must travel from the engine to ground level is greatly increased. This increased distance enables the sound energy to be dissipated in the air so that perceived sound levels on the ground are of less intensity. Put another way, when an aircraft engine is in its normal and essentially horizontal position, during approach and landing to an airport, the sound propagated from the shrouded fan nozzle of FIG. 2 is in a generally or essentially axial direction, requiring a relatively long path of travel to reach the ground. In distinction, the conventional arrangement of FIG. 1, during such flight conditions, provide almost, if not completely, the shortest path of travel of propagated sound to reach ground level over which a flight is taking place. The effect of the present invention is not primarily to limit the level of sound propagated from the fan nozzle, but to control the path of travel of the sound so that the longest possible path of travel is had and sound levels have an opportunity to dissipate before reaching an area that would be affected. Further, the areas affected by sound are reduced and greater effectiveness can be had from controlling an aircraft's landing and takeoff courses to direct the sound towards areas having minimum population.

As was indicated above, the shroud gas stream has a high sonic speed. This term is referenced against the sonic speed of the fan stream in which the noise energy, generated by the fan blades, is carried. FIG. 3 illustrates the effects of the shroud gas stream on the noise waves within the fan stream. Fan noise is propagated from the nozzle 28 in a generally rearwardly direction at random angles. In FIG. 3 one such angle of propagation is illustrated by a vector, identified as incident sound. At the illustrated angle, a portion of the sound energy will be reflected, as indicated by the vector identified as reflected sound. Another portion of the energy of the incident sound vector will pass into the shroud stream at a refracted lesser angle, indicated by the vector identified as refracted sound. Thus, the sound energy will be generally confined by the shroud stream to attain a field of maximum noise propagation, as indicated in FIG. 2. It is, of course, appreciated that the degree to which the sound energy will be reflected and refracted is a function of its incident angle and that some sound energy will propagate at a relatively wide angle. However, the maximum level of intensity is maintained within the narrow angle, indicated in FIG. 2.

While the present invention broadly pertains generally to the use of a shrouding gas stream having a higher sonic speed than the pressurized fan air stream, it is preferable to provide the necessary higher sonic speeds by controlling either of two known parameters which affect sonic speed, namely, temperature and/or molecular weight of the shroud stream. Additionally, there are other preferred parameters for the described shroud stream. First, it is preferable that the velocity of the shroud stream be equal or greater than that of the fan stream in which the noise energy is carried. Secondly, it is preferable that the annular thickness of the shroud stream be at least equal to one-quarter of the wave length of the predominant sound frequency in the fan stream. In most cases, the predominant frequency in the fan stream is the blade passing frequency of the fan rotor blades relative to the outlet guide vanes. Such frequency and wave length are readily calculated to establish the desired thickness of the shroud stream for any given engine.

FIG. 4 illustrates one embodiment of the present invention in which the shroud stream, having an increased temperature, is employed to minimize the angle of noise propagation from a fan stream nozzle. The turbofan engine 40 differs from the engines 10 and 10' of FIG. 1 in that it is of the so-called, short cowl or short duct configuration. The basic elements, however, are the same in that a bladed fan rotor 42 pressurizes an air stream within a cowl 44. The air stream is straightened to an axial flow direction by outlet guide vanes 46. An inner portion of the air is split by the leading edge of a nacelle 48 with the inner portion of the air stream entering a core engine inlet 50, and the remainder of the pressurized air enters a fan duct 52. The pressurized fan air is then discharged from an annular propulsive nozzle 54, defined by the inner surface of the shroud 44 and the nacelle 48. An annular shroud nozzle 56 is formed in the downstream end of the cowl 44 concentrically of the nozzle 54. A portion of the pressurized air stream is diverted into a combustion zone 58, upstream of the shroud nozzle 56. This diverted air supports combustion of fuel provided from an appropriate fuel supply 60 to generate a hot gas stream which is discharged from the annular shroud nozzle 56. Air to support combustion in the combustor 58 could also be derived from the core engine compressor. Also it would be possible to duct hot gases from the core engine to shroud nozzle 56.

In burning normal hydrocarbon fuel, there is no significant difference between the molecular weight of the shroud stream and the fan air stream. However, temperature increases are readily obtained to provide the desired increase in sonic speed of the shroud gas stream. A high temperature shroud stream will have greatest effectiveness in limiting the angle of noise propagation as well as minimum cost when its temperature is maintained within the preferred limits of 2 to 5 times the absolute temperature of the fan air stream. Under standard day operating conditions, the shroud stream temperature would be between approximately 600° F. and 2,140° F.

Figure 5:
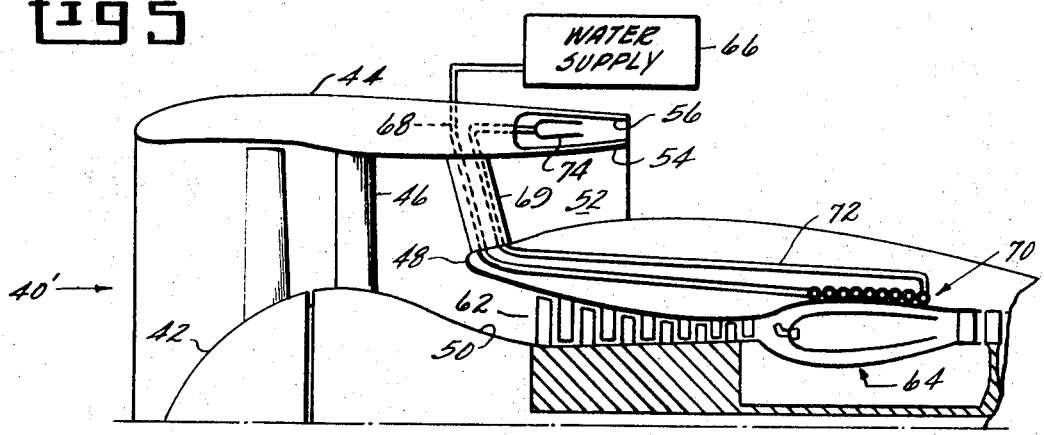
FIG. 5 is a simplified showing of an alternate embodiment of the invention.

FIG. 5 illustrates a means for producing a shroud stream having a significantly lower molecular weight than the fan air stream. This is illustrated in FIG. 5 in an engine 40' which is otherwise identical with the engine 40 of FIG. 4. FIG. 5 shows, in addition to what is seen in FIG. 4, the core engine compressor 62 and core engine combustor 64. Water is provided from a suitable supply 66 through a tube 68, through a strut 69, to a heat exchanger 70, which is coiled about the combustor 64. The discharge from the heat exchanger 70 is carried through a tube 72 to a discharge head 74 disposed upstream of the annular shroud nozzle 56. The shroud stream thus provided is a water vapor stream having a significantly lower molecular weight than the fan air stream and is effective in the manner above-described to control the angle of propagation of sound from the nozzle 54. Additionally, the steam, shroud stream has a higher temperature than the fan air stream to further contribute to its effectiveness.

In either of the embodiments of FIG. 4 or 5, means may be provided to shut off the fuel supply or water supply, respectively, so that the shroud stream is utilized only under conditions where noise is of serious consequence in the operation of the aircraft. This minimizes the amount of fuel or water which must be carried aboard an aircraft for sound suppression purposes.

Figure 6:
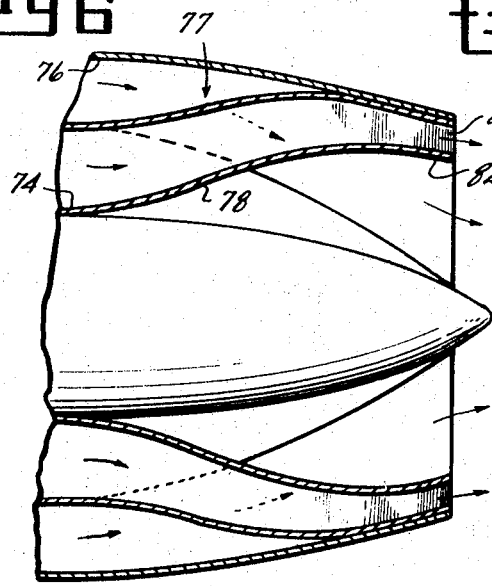
FIG. 6 is another alternate embodiment of the invention, illustrating the use of the core engine hot gas stream to control fan noise.
Figure 7:
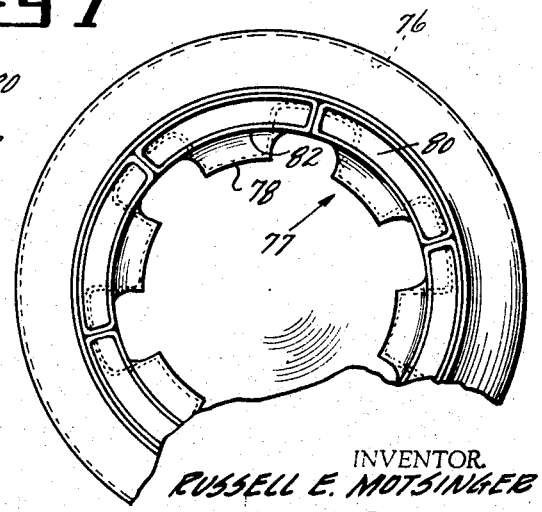
FIG. 7 is an end view of the engine shown in FIG. 6.

FIGS. 6 and 7 illustrate a further embodiment of the invention wherein the hot gas stream discharge of the core engine is utilized for sound suppression purposes.

In FIG. 6 the core engine hot gas, discharge passageway, from the fan turbine (not shown) is indicated at 74. The annular fan stream passageway is indicated at 76, within a long duct type of engine as illustrated in FIGS. 1 and 2. These streams pass through a flow everter 77 similar in structure (but different in function) to a mixer. This device, in effect, turns the two streams inside out. This will be more apparent from also referencing FIG. 7, which indicates that the hot gas stream is directed through a plurality of ducts 78, which, as they continue in a downstream direction, cross through the fan duct and progressively transform to an annular configuration. The downstream ends of these ducts thus provide an annular discharge nozzle 80 for the hot gas stream which serves as a shroud stream. The fan stream is discharged from a propulsive nozzle 82, the outer bounds of which are defined by the inner surfaces of the ducts 78.

With the arrangement described in FIGS. 6 and 7, sound suppression may be effectively utilized in all flight regimes and avoid the necessity of providing controls for actuation and deactuation of a sound control mechanism.

Turbofan engines take many different forms and the types illustrated herein are intended merely to teach the principles of the present inventive concepts. It is, therefore, to be understood that many different types of engines could be devised by those skilled in the art to take advantage of the teachings herein. Further, while reference has been made to complete annular shrouding gas streams, it will be apparent that controlling the angle of directivity of noise propagation from a nozzle, in an aircraft engine, may be desirable only in the lower portion of the nozzle, in that upwardly propagated noise is generally of no significant consequence. In view of these factors it is, therefore, to be understood that the scope of the present invention is to be derived solely from the appended claims.

Having thus described the invention, what is claimed as novel and desired to be secured by Letters Patent of the United States is:

1. A turbofan engine comprising:
    a bladed fan rotor for pressurizing an air stream,
    a propulsive nozzle from which the air stream is discharged to provide a propulsive force,
    means for generating a gas stream having a substantially higher sonic speed than the fan air stream and discharging the gas stream from at least the lower portions of said nozzle as an outer boundary layer shroud for said air stream,
    whereby sound energy within said air stream is limited as to its angle of propagation from the nozzle.

2. A turbofan engine as in claim 1, wherein the means for generating a high sonic speed gas stream take the form of means for providing a gas stream having a substantially higher temperature than the fan air stream.

3. A turbofan engine as in claim 2 wherein the means for providing a higher temperature gas stream, heat the gas stream to a temperature between approximately two to five times the temperature of the fan air stream, based on absolute temperature scale.

4. A turbofan engine as in claim 1 wherein the form of means for providing a gas stream having a substantially lower molecular weight than the fan air stream.

5. A turbofan engine as in claim 4 wherein the means for providing a low molecular weight gas stream comprises means for generating a vaporized water stream.

6. A turbofan engine as in claim 1 wherein the means for discharging the gas stream take the form of means for discharging a full annular shroud surrounding said fan stream.

7. A turbofan engine as in claim 6 wherein sound energy within said air stream has at least one dominant frequency and further wherein the annular thickness of said shroud stream is approximately equal to at least one-quarter the wave length of the lowest dominant frequency.

8. A turbofan engine as in claim 6 wherein the means for discharging the shroud stream provided a velocity therefor at least equal to the velocity of the fan air stream as it is discharged from the propulsive nozzle.

9. A turbofan engine as in claim 6 further comprising:
    a cowl within which the fan rotor rotates, and
    a nacelle housing a core engine for driving the fan rotor, said cowl terminating intermediate the length of said nacelle and forming, in combination therewith, said propulsive nozzle and further wherein,
    the shroud stream discharging means take the form of an annular nozzle at the rear end of said cowl concentric of said propulsive nozzle.

10. A turbofan engine as in claim 6, further comprising:
    a core engine in the form of a hot gas stream generator, providing means for driving said fan rotor and also providing the means for generating the high sonic speed shroud stream, and
    means for ducting at least a portion of the core engine hot gas stream to said shroud stream discharging means.

11. A turbofan engine as in claim 10, wherein:
    the fan stream propulsive nozzle is downstream of the core engine, and
    the ducting means comprise means for ducting the core engine hot gas stream discharge to an annular nozzle surrounding said fan stream propulsive nozzle.

References Cited

UNITED STATES PATENTS

| | | |
|---|---|---|
| 2,931,169 | 4/1960 | Glenn. |
| 3,069,848 | 12/1962 | Griffith. |
| 3,187,501 | 6/1965 | Quick. |

FOREIGN PATENTS

| | | |
|---|---|---|
| 1,157,063 | 12/1957 | France. |

ROBERT S. WARD, JR., Primary Examiner

U.S. Cl. X.R.

181—51, 52; 239—127.3, 265.17, 265.23